UNITED STATES PATENT OFFICE.

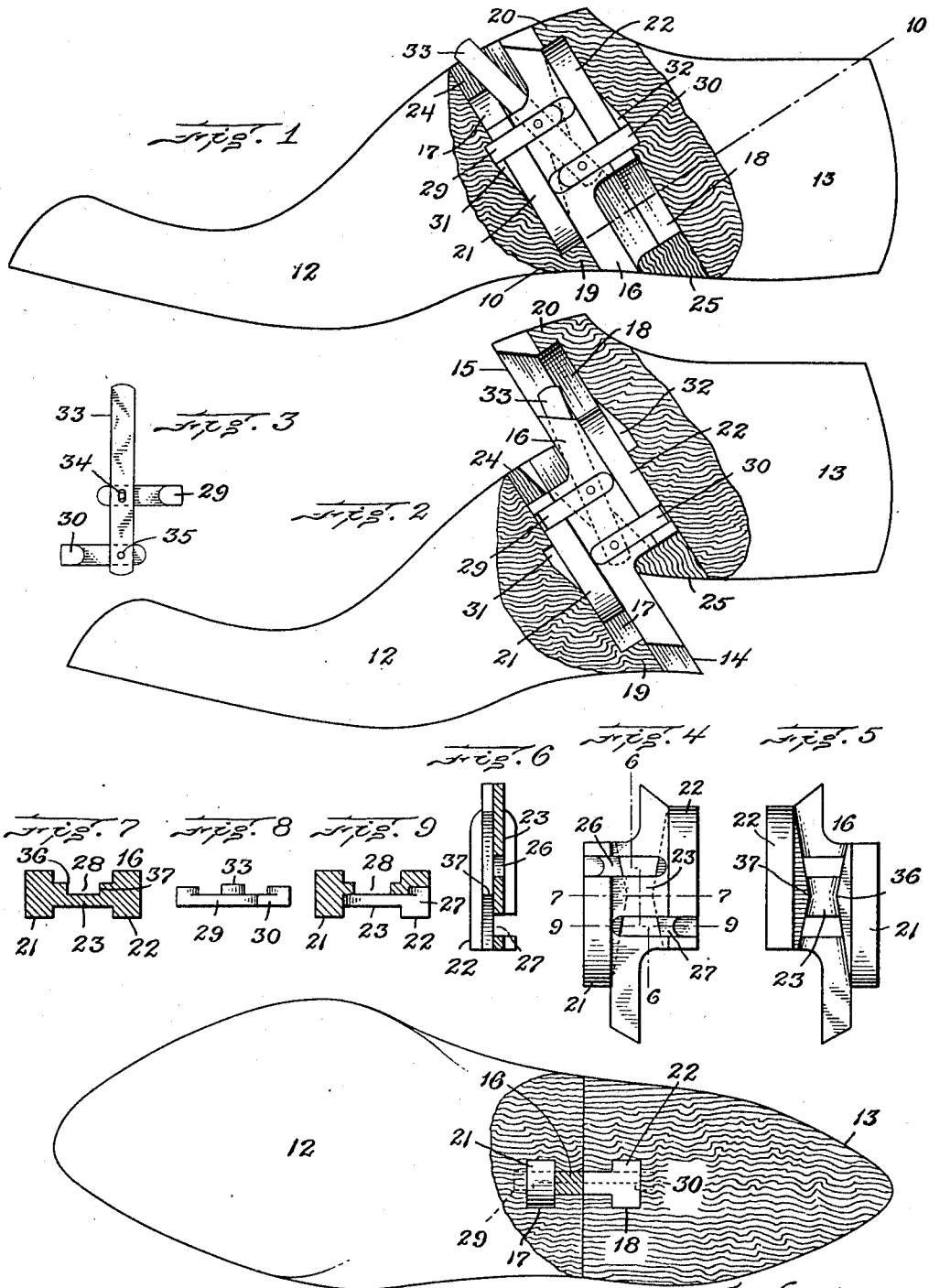
H. A. BALLARD.
LAST.
APPLICATION FILED MAR. 12, 1909.
1,020,677. Patented Mar. 19, 1912.

HARRIE A. BALLARD, OF BOSTON, MASSACHUSETTS, ASSIGNOR TO THE BOYLSTON MANUFACTURING COMPANY, OF SOUTH BOSTON, MASSACHUSETTS, A CORPORATION OF NEW JERSEY.

LAST.

1,020,677. Specification of Letters Patent. Patented Mar. 19, 1912.

Application filed March 12, 1909. Serial No. 482,903.

*To all whom it may concern:*

Be it known that I, HARRIE A. BALLARD, of Boston, in the county of Suffolk and State of Massachusetts, have invented certain new and useful Improvements in Lasts, of which the following is a specification.

This invention relates to lasts which are divided and which comprise a forepart and a heel-part adapted to slide relatively to each other with a foreshortening effect for the purpose of facilitating the insertion in and removal from a shoe.

In addition to the forepart and heel-part, the invention embodies a coupling member therefor which is so connected with each part as to have sliding relation therewith. An advantage of coupling a forepart and heel-part by a member adapted to slide relatively to each part, lies in the fact that the total movement of one part relatively to the other is equal to the sum of the movements of the two parts relatively to the coupling member. For instance if the movement of the coupling member relatively to the forepart is one-half an inch and the movement relatively to the heel-part is one-half an inch, it follows that the movement of the heel-part relatively to the forepart is one inch. As a result of dividing the forepart and heel-part on a plane inclined to a perpendicular transverse plane, a sufficient foreshortening effect may be obtained for all purposes.

The invention also embodies locking means installed in the coupling member and adapted to engage both the forepart and heel-part for the purpose of locking the coupling member with both parts.

In order to provide an inexpensive means for holding the two parts together in sliding relation, the abutting faces thereof are formed with undercut grooves, and the coupling member is formed with portions which fit in the undercut portions of the grooves. For the purpose of preserving as far as possible the original exterior surface of the last, the groove in one part may extend from one edge part way toward the opposite edge, and the groove in the other part may extend from the opposite edge and in the opposite direction part way toward the first-mentioned edge. By so forming the grooves each has an end wall which may serve as an abutment for the coupling member. If desired, the open ends of the grooves may be subsequently closed by inserting blocks with permanent fastenings.

Of the accompanying drawings which illustrate one form in which the invention may be embodied, Figure 1 is a left side elevation of a last in closed position, of which portions are broken out. Fig. 2 is a similar view of a last in open position. Fig. 3 is a right side elevation of the locking means. Fig. 4 is a left side elevation of the coupling member. Fig. 5 is a right side elevation of the coupling member. Fig. 6 is a section on line 6—6 of Fig. 4. Fig. 7 is a section on line 7—7 of Fig. 4. Fig. 8 is a top edge view of the locking means. Fig. 9 is a section on line 9—9 of Fig. 4. Fig. 10 is a section on line 10—10 of Fig. 1.

The same reference characters indicate the same parts wherever they occur.

On the drawings the forepart of a last is indicated at 12 and the heel-part at 13. The forepart and heel-part are adapted to slide with relation to each other, and in order that the sliding movement may have the effect of foreshortening, the two parts are divided on a plane inclined to a transverse perpendicular plane. The inclined plane preferably intersects the instep approximately midway thereof, and the sole at the rear of the arch. By so dividing the last, the forepart is provided with an inclined rear face 14 and the heel-part with an inclined front face 15, said faces being adapted to abut and to slide upon each other. The coupling member is indicated at 16 and the forepart and heel-part are formed respectively with undercut grooves 17 and 18 for its reception. The grooves 17 and 18 are formed so as to be parallel when the last is assembled and may be T-shaped in cross section, dovetailed, or of any other undercut shape, and are preferably arranged as follows:—In one part, the forepart for instance, the groove is begun at the instep and continued across the face 14 part way toward the arch, leaving an uncut portion 19 as an end wall or abutment. The groove in the heel-part is begun at the arch and continued in the opposite direction across the face 15 part way toward the instep leaving a similar abutment or end wall 20. Although the precise length of the grooves is not material yet they should be of sufficient length to overlap when the forepart and heel-part are in open position. The two grooves combined form a chamber of I-shape cross section which is that of the coupling member 16. In order to fit in the grooves 17 and 18 and hold the forepart and heel-part together, the coupling member is formed with parallel enlarged portions 21 and 22 joined by a web 23. It is desirable that the coupling member be long enough to hold the forepart and heel-part together with sufficient rigidity to withstand the strains of ordinary usage. On the other hand, it must be not so long as to unduly limit the sliding movement of the forepart and heel-part.

After the two parts and coupling member have been assembled, the open ends of the grooves 17 and 18 may be partially, if not wholly, closed by inserting blocks 24 and 25 and securing them by any desired form of fastening. According to the construction and arrangement illustrated, it may be seen that the movement of each part relatively to the coupling member is equal to the distance between the permanent end wall and the inserted block minus the length of the enlarged portions of the coupling member. In other words the said enlarged portions are adapted to abut against the permanent end walls when the last is closed and against the blocks when open.

The coupling member is formed for the reception of locking means by which it may be locked with both the forepart and the heel-part. For this purpose it has transverse parallel grooves 26, 27 formed on one side and a longitudinal rabbeted chamber 28 formed on the other side and opening into the grooves 26 and 27. The grooves 26 and 27 are occupied respectively by locking members 29 and 30 such as bolts. The locking members are adapted to slide longitudinally in the grooves toward and from the forepart and heel-part respectively. The forepart is formed with a recess 31 for the reception of the locking member 29 and the heel-part is formed with a similar recess 32 for the member 30. When the last is closed as in Fig. 1, the recesses 31 and 32 register with the members 29 and 30 so that the latter may be projected for the purpose of locking the coupling member against the end walls 19 and 20 of the forepart and heel-part. For the purpose of moving the locking members 29 and 30, a manually operative lever 33 is provided. The lever occupies the rabbeted chamber 28 in the opposite face of the coupling member and is pivotally connected to the two locking members as indicated at 34 and 35. The point of connection with one of said members is preferably of the pin and slot form which is shown at 34.

Instead of providing a fixed axis or fulcrum for the lever 33, it may be rocked upon the side edges of the rabbeted chamber 28 midway between the grooves 26 and 27. For this purpose the side edges of said chamber are formed as obtuse angles of which the meeting points 36 and 37 constitute fulcra for the lever 33. If desired the locking ends of the members 29 and 30 may be provided with enlargements as indicated in Figs. 3 and 8 in order to present increased surfaces to the coöperative walls of the recesses 31 and 32.

Having thus explained the nature of my said invention and described a way of constructing and using the same, although without attempting to set forth all of the forms in which it may be made or all of the modes of its use, I declare that what I claim is:—

1. A last comprising two confronting members, namely, a forepart, and a heel-part, parallel undercut grooves formed in the confronting portions of the two parts, and a sliding coupling member formed with flanged portions adapted to fit in the undercut portions of the grooves, and an intermediate web portion joining said flanged portions.

2. A last comprising two confronting members, namely, a forepart, and a heel-part, parallel T-shaped grooves formed in the confronting faces of the two parts, and an elongated sliding coupling member of I-shaped section occupying said T-shaped grooves.

3. A last comprising a forepart formed with an undercut groove in its rear face, a heel-part formed with an undercut groove in its front face, a coupling member having a sliding fit in said grooves, and locking means carried by the coupling member and adapted to lock it with both of said parts.

4. A last comprising a forepart formed with an undercut groove in its rear face, a heel-part formed with an undercut groove in its front face, a coupling member having a sliding fit in said grooves, a pair of locking members carried by said coupling member and adapted to engage respectively the forepart and heel-part, and a handle for actuating the locking members.

5. A last comprising a forepart formed with an undercut groove in its rear face, a heel-part formed with an undercut groove in its front face, a coupling member having a sliding fit in said grooves, a pair of locking members carried by said coupling member adapted to engage respectively the forepart and heel-part, recesses formed in the forepart and heel-part for the reception of the locking members, and a lever for actuating the locking members.

6. A last comprising a forepart, a heel-part, a sliding member connecting said parts so as to hold them together, recesses formed in the two parts and in said sliding member, locking means including a manually operative actuator installed in the recesses of said sliding member and adapted to enter the recesses in the forepart and heel-part.

7. A last comprising a forepart and heel-part having abutting faces, an undercut groove in one abutting face extending from one edge part way toward the opposite edge, an undercut groove in the other abutting face extending in the opposite direction from the opposite edge part way across said face, and a coupling member having a sliding fit in said grooves and formed to engage the undercut portions and hold the two parts together.

8. A last comprising a forepart and heel-part divided on a plane intersecting the arch and instep, an undercut groove in the abutting portion of one part extending from the arch part way toward the instep, an undercut groove in the abutting portion of the other part extending from the instep part way toward the arch, a coupling member adapted to slide in said grooves and hold the two parts together, and means for locking the coupling member with both parts.

9. In a divided last, a heel portion; a toe portion; and a sliding connecting member extending from one portion to the other, and having engaging parts at opposite sides contained in undercut recesses or key-ways formed in the heel and toe portions of the last.

10. A divided last having heel and toe portions provided with oblique engaging surfaces and with parallel key-ways, combined with a key shorter than said key-ways, whereby the heel and toe portions are held in close engagement, but are capable of relative movement.

11. In a divided last, the combination with the heel and toe portions each provided with an internal key-way and a slot extending from said key-way to the surface; of a key formed in a single piece and having parallel engaging portions to engage said key-ways and a main portion extending through said slots from one key-way to the other.

12. The herein described connecting member for a divided last which consists of a thin body portion provided with parallel enlarged portions at opposite sides, said enlarged portions being longitudinally offset with relation to each other.

13. In a divided last, a heel portion; a toe portion; and a connecting member extending from one portion to the other, and having an engaging part extending through a slot into an undercut recess in one of said portions, said recess being longer than said engaging part to admit of a longitudinal movement of said connecting member therein, and being closed at both ends.

In testimony whereof I have affixed my signature, in presence of two witnesses.

HARRIE A. BALLARD.

Witnesses:
 GEO. T. ARMSTRONG,
 M. E. CAPEN.

---

Copies of this patent may be obtained for five cents each, by addressing the "Commissioner of Patents, Washington, D. C."